Patented Feb. 27, 1945

2,370,349

UNITED STATES PATENT OFFICE 2,370,349

HERBICIDES

Francis E. Hance, Honolulu, Territory of Hawaii

No Drawing. Application October 11, 1943,
Serial No. 505,852

19 Claims. (Cl. 167—45)

This invention relates to herbicides, and it comprises a herbicidal composition containing a herbicidal agent and a water soluble salt of a polychlorophenol to activate the herbicidal agent so that when the composition is admixed with water for preparing an aqueous mixture for use, the total amount of herbicidal agent and salt of polychlorophenol is less than is required to obtain a like degree of herbicidal activity when either of said substances is used alone; and it further comprises aqueous mixtures of said constituents for application as a herbicidal solution.

Herbicidal agents hitherto proposed for the application or control of weed growth consist, in the main, of inorganic salts as the chlorates or arsenites, sulfuric acid, and petroleum fractions. Sodium arsenite is a well known herbicide, and it is used as an aqueous solution having an arsenic content, expressed as $As_2O_3$, of at least 10 pounds to 100 gallons. This relatively high concentration is required for weed killing purposes, but the soil itself is frequently rendered sterile thereby. In addition, arsenic solutions of this concentration are crop destroyers in many instances. The chlorates, such as sodium or calcium chlorate, are also used commercially as weed-killers but they also have disadvantages. These salts are expensive since as much as 100 pounds of sodium chlorate to 100 gallons of solution are required. The chlorates are soil sterilizers, and may inhibit, or even entirely prevent that micro-biological growth necessary in the soil for the propagation of crops.

The petroleum type herbicides have the disadvantage that they cannot be used in high concentration because these materials must be emulsified in water, and such emulsions are of necessity rather dilute if they are to be sprayable. And sprayability is a practical requirement since large areas of plant growth must be covered expeditiously. Sulfuric acid suffers from many obvious disadvantages, due to its corrosive character, and danger to personnel.

It is thus to be seen that many of the disadvantages inherent in herbicidal solutions are directly attributable to the quantity which is necessary for successful use. Thus, in the case of the inorganic type of materials, i. e. arsenites, chlorates, and others, the concentration required is so high as to result in soil sterilization, crop damage, and even contamination of the crops themselves by traces of arsenic. In the case of the petroleum types, not enough herbicidal agent can be incorporated in the aqueous mixture to give the desired results.

The problem, therefore, is one of finding means whereby lesser quantities of these various herbicidal agents can be used with same or even greater effectiveness. As a result of my researches I have discovered a class of chemical compounds which can be admixed with herbicidal agents in small quantities, and which "activate" the herbicidal agents by so-called synergistic action. The activating agents of the present invention can be generically defined as the water soluble salts of polychlorophenols. Any of the polychlorophenols can be used in the practice of my invention. Among them I specifically mention the tri, tetra, and penta chlorophenols. When using these activators much less of the herbicidal agent is necessary in order to get equal or better herbicidal activity (in comparison with mixtures containing no activator, but having sufficient herbicidal agent to be operative). Thus, by utilizing the discoveries of the present invention, I can reduce the quantity of arsenic from, for example, 10 pounds as $As_2O_3$, to as little as 2 pounds in 100 gallons of water, provided small amounts of a sodium salt of a polychlorophenol are also present. Similar decreases in the amount of chlorate in the chlorate type herbicides can be also effected. Improvement in the petroleum emulsion types are likewise obtained when small amounts of the water soluble salts of polychlorophenols are added.

In an ordinary conventional arsenite herbicide there will be about 10 pounds of arsenic as $As_2O_3$ and 2 pounds of sodium hydroxide for each 100 gallons of water. By utilizing my invention I can get equal or better herbicidal activity under the same conditions of use with 100 gallons of a solution containing but 2.5 pounds of arsenic as $As_2O_3$, and 0.5 pound of sodium hydroxide, provided the solution also contains small amounts of a water soluble salt of a polychlorophenol. Three pounds of sodium pentachlorophenate have been found adequate to activate the arsenic. Similar activation is obtained with the water soluble salts of the tri, and the tetra chlorophenols, which, along with the penta compounds, are the commoner polychlorophenols. The amount of activator can, of course, be varied considerably but two to three pounds is adequate for the solution just described.

Thus, an aqueous sodium arsenite solution containing but 2.5 pounds of arsenic as $As_2O_3$ and 3 pounds of a sodium salt of a polychlorophenol is as good as, or better than a solution of 12.5 pounds of arsenic alone, each in 100 gallons of water.

Sodium pentachlorophenate has been suggested for use as a herbicide, but in concentrations of about 8 pounds to 100 gallons of water. Here the pentachlorophenate is the essential herbicidal agent. In the compositions of my invention the amount of pentachlorophenate, as well as that of the other polychlorophenates, is less than that which would give any substantial herbicidal effect. So, also is the amount of sodium arsenite. Neither of these substances, when used alone in the concentrations of the present invention, would constitute an active commercial herbicidal solution. Yet by using them together, in concentrations individually inadequate, herbicidal activity is high indeed. The only possible explanation for this action appears to be one of "activation."

A conventional chlorate type herbicide contains for each 100 gallons of solution, about 100 pounds of sodium chlorate and 100 pounds of calcium chloride. By using the discoveries of the present invention I can reduce the amount of sodium chlorate to but 20 pounds, and entirely omit the calcium chloride, provided but 3 pounds of sodium pentachlorophenate, or similar amounts of the tri or tetra chloro compounds are added. Comparable herbicidal activity requires 100 pounds of sodium chlorate in 100 gallons of water, or 8 pounds of sodium pentachlorophenate in 100 gallons of water; yet by using a mixture of the two materials the quantity of each can be greatly reduced.

Another important modification of my invention consists in using a mixture of sodium arsenite, sodium chlorate and a water soluble salt of a polychlorophenol. For example, one such solution which has produced excellent results consists of 2 pounds of arsenic as $As_2O_3$, 0.2 pound of caustic soda, 3 pounds of sodium chlorate and 3 pounds of sodium pentachlorophenate, all in 100 gallons of water. Here the amount of arsenic is further reduced by including a small amount of sodium chlorate. Used alone, 100 pounds of sodium chlorate in 100 gallons of water, or 12.5 pounds of sodium arsenite in 100 gallons of water would be necessary to give equal herbicidal activity. As stated, other water soluble salts of the polychlorophenols can be used in this mixture as well.

The foregoing active ingredients may be mechanically mixed and then added to the water. It is obvious that the concentration of the herbicidal composition may be varied by using more or less than 100 gallons of water; for example, 60 to 120 gallons may be used instead of the 100 gallons as suggested by the foregoing illustrative examples.

Wetting agents can also be added to my herbicidal compositions. Any of the well known sulfonated oils and sulfonated esters or alcohols can be used. These materials function as spreading agents. Amounts thereof are not controlling. For example, one quart of a 10 percent solution of a sulfated alcohol for each 100 gallons of herbicidal solution is enough.

I do not wish to be limited to propositions stated above. These can vary, but the addition of large amounts of the water soluble polychlorophenates is wasteful. I prefer to use just enough to activate the herbicidal agent itself. Water soluble salts, such as the potassium salts, of the polychlorophenols can, of course, be used instead of the sodium salt. The amounts of herbicidal agent stated have been selected to provide compositions having herbicidal activity comparable to that of strong arsenite or chlorate solutions hitherto used. But here again variation is possible depending upon the use to which the herbicide is put. If the composition is to be used along railroad rights of way for example, where no cultivation of the soil is contemplated then the amount of the arsenite or chlorate, or both can be increased if necessary, although still kept below the amounts dangerous to man, provided polychlorophenates are also added. But my invention is particularly well adapted for weed control in cultivated areas since I am thus able to control weed growth without damage to the soil or contamination of the growing crops.

Although I have more particularly described my invention with respect to herbicidal solutions containing arsenites, chlorates, or both, along with the polychlorophenates, I do not wish to be limited to the activation of such herbicidal agents alone. It will be apparent to those skilled in the art that the present invention offers a way of activating any of the hitherto known herbicidal agents and therefore I do not intend that my invention shall be limited to any particular herbicidal material. Although activation and synergistic action is obscure, I believe that the polychlorophenate "paves the way" in some manner for the herbicidal agent to work more effectively in lesser quantity. I cannot account for the action otherwise since I do not believe the activator and the herbicidal material react chemically. The activator, I believe, cooperates in some manner with the herbicidal material, and with the weed structure in such fashion that the weed is first attacked by the activator so that minor quantities of the herbicidal agent itself then suffice to finish the killing job. It will therefore be apparent that the activators can, and probably will, activate the common herbicidal materials generally, although of them, the arsenites and chlorates, are the most useful commercially. That is why I have described my invention with especial reference thereto.

And while I have described my invention with more particular reference to aqueous solutions ready for use, the invention also consists in mixtures of the herbicidal agent and the water soluble polychlorophenate ready to be admixed with water prior to use, and I claim such mixtures in the appended claims. Such mixtures embrace not only mixtures of inorganic herbicidal salts, such as the arsenites and chlorates, and water soluble polychlorophenates, they include mixtures of the phenates with petroleum oils having herbicidal properties, and ready for emulsification in water prior to use.

This application is a continuation in part of my pending application Serial No. 351,551, filed August 5, 1940.

Having thus described my invention, what I claim is:

1. An aqueous herbicidal solution containing a water-soluble arsenite and a water-soluble pentachlorophenate, the combined amounts of said substances being a fraction of the amount required when either is used separately in an aqueous solution to produce an equivalent herbicidal effect.

2. An aqueous herbicidal solution containing sodium arsenite and sodium pentachlorophenate, the combined amounts of said substances being a fraction of the amount required when either is used separately in an aqueous solution to produce an equivalent herbicidal effect.

3. An aqueous herbicidal solution containing a water-soluble chlorate and a water-soluble pentachlorophenate, the combined amounts of said substances being a fraction of the amount required when either is used separately in an aqueous solution to produce an equivalent herbicidal effect.

4. An aqueous herbicidal solution containing sodium chlorate and sodium pentachlorophenate, the combined amounts of said substances being a fraction of the amount required when either is used separately in an aqueous solution to produce an equivalent herbicidal effect.

5. An aqueous herbicidal solution containing a water-soluble arsenite, a water-soluble chlorate, and a water-soluble pentachlorophenate, the combined amounts of said substances being a fraction of the amount required when either is used separately in an aqueous solution to produce an equivalent herbicidal effect.

6. An aqueous herbicidal solution containing sodium arsenite, sodium chlorate and sodium pentachlorophenate, the combined amounts of said substances being a fraction of the amount required when either is used separately in an aqueous solution to produce an equivalent herbicidal effect.

7. An aqueous herbicidal solution containing, in 100 gallons thereof, about 2 pounds of arsenic as $As_2O_3$, about 0.2 pound of caustic soda, about 3 pounds of sodium chlorate, and about 3 pounds of sodium pentachlorophenate.

8. An aqueous herbicidal solution containing, in 100 gallons thereof, about 20 pounds of sodium chlorate and 3 pounds of sodium pentachlorophenate.

9. An aqueous herbicidal solution containing, in 100 gallons thereof, about 2.5 pounds of arsenic as $As_2O_3$, about 0.5 pound of caustic soda and about 3 pounds of sodium pentachlorophenate.

10. A herbicidal composition containing a water soluble inorganic herbicidal salt chosen from the group consisting of arsenites and chlorates and a water soluble salt of a polychlorophenol to activate the herbicidal salt so that, when the composition is dissolved in water for preparing an aqueous solution for use, the total amount of said constituents is less than is required to obtain a like degree of herbicidal activity when either of said constituents is used separately.

11. A herbicidal composition containing a water soluble inorganic herbicidal salt chosen from the group consisting of arsenites and chlorates and a water soluble sodium salt of a polychlorophenol to activate the herbicidal salt so that, when the composition is dissolved in water for preparing an aqueous solution for use, the total amount of said constituents is less than is required to obtain a like degree of herbicidal activity when either of said constituents is used separately.

12. A herbicidal composition containing a water soluble arsenite and a water soluble polychlorophenate to activate the arsenite so that, when the composition is dissolved in water for preparing an aqueous solution for use, the total amount of said constituents is less than is required to obtain a like degree of herbicidal activity when either of said constituents is used separately.

13. A herbicidal composition containing a water soluble chlorate and a water soluble polychlorophenate to activate the chlorate so that, when the composition is dissolved in water for preparing an aqueous solution for use, the total amount of said constituents is less than is required to obtain a like degree of herbicidal activity when either of said constituents is used separately.

14. An aqueous herbicidal solution containing a water soluble arsenite and a water soluble polychlorophenate, the combined amounts of said substances being a fraction of the amount required when either is used separately in an aqueous solution to produce an equivalent herbicidal effect.

15. An aqueous herbicidal solution containing a water soluble chlorate and a water soluble polychlorophenate, the combined amounts of said substances being a fraction of the amount required when either is used separately in an aqueous solution to produce an equivalent herbicidal effect.

16. An aqueous herbicidal solution containing a water soluble arsenite, a water soluble chlorate, and a water soluble polychlorophenate, the combined amounts of said substances being a fraction of the amount required when either is used separately in an aqueous solution to produce an equivalent herbicidal effect.

17. A herbicidal composition as in claim 10 wherein the water soluble salt of a polychlorophenol is a water soluble trichlorophenate.

18. A herbicidal composition as in claim 10 wherein the water soluble salt of a polychlorophenol is a water soluble tetrachlorophenate.

19. A herbicidal composition as in claim 10 wherein the water soluble salt of a polychlorophenol is sodium pentachlorophenate.

FRANCIS E. HANCE.